July 26, 1938.  D. S. WEISS  2,124,839

AUTOMOBILE TRAILER COUPLING

Filed March 8, 1937

*Inventor:*
Dewey S. Weiss,
By Rudolph B. Prentice
*Attorney*

Patented July 26, 1938

2,124,839

UNITED STATES PATENT OFFICE 2,124,839

AUTOMOBILE TRAILER COUPLING

Dewey S. Weiss, Portland, Oreg.

Application March 8, 1937, Serial No. 129,602

8 Claims. (Cl. 280—33.15)

My invention relates to automobile trailer couplings of the kind adapted to retain the trailer-tongue in pivotal attachment to the tractor car and to permit of the easy coupling and uncoupling of the trailer.

The principal object of my invention is to provide such a device capable of practical use under service conditions that will insure complete security.

Other objects and advantages of my invention will be apparent in the following discourse wherein the significance of the reference numerals in the accompanying drawing, suggestive details of construction and operation of couplings embodying my invention, and the particular advantages thereof are explained.

Figure 1:
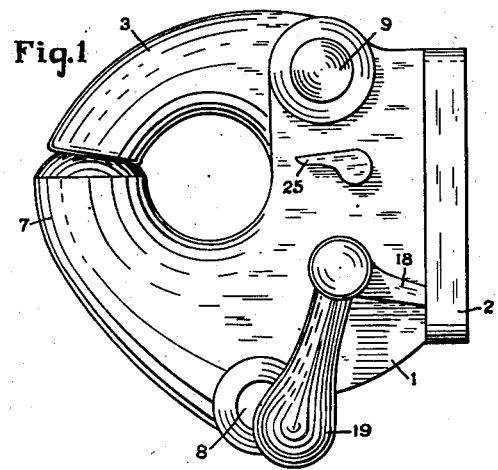
Figure 1 represents a view of the side of the coupling in elevation.

A body 1 integral with a plate member 2 extending perpendicularly on both sides of the former, is chambered and journaled to receive the pivotally mounted retainer 3, the rotary lock 4, and latch 5 with its spring 6, and further formed with a hook 7 suited to receive the trailer-tongue eye or other convenient fitting. A hole 8 is provided for the attachment of a safety-chain shackle.

The retainer 3, pivotally mounted on the transverse pin 9, is formed and proportioned with an arcuate face 10 considerably removed from the axis of the pin 9, and a channel 11 the outermost wall 12 of which is substantially circular and concentric with the pin 9 and the innermost wall 13 of which is partially concentric with the outermost wall 12 and partially eccentric thereto as indicated at 14.

The rotary lock 4 is secured rigidly to a shaft 15 and is formed in detail with a substantially arcuate convex face 16 slightly eccentric to the face 10 of the retainer 3 and the shaft 15 upon which it is secured, and an oppositely extending arm or trip 17 integral therewith.

The shaft 15 is positioned with reference to the center of curvature of the arcuate face 10 of the retainer 3 so that the rotary lock 4 may rotate within the space embraced by this arcuate face 10 with only so much resistance as is provided by the eccentricity of the face 16 of the rotary lock 4 before alluded to.

The rotation of the lock 4 is controlled by a convenient handle 19 formed with a stop 18 to limit the motion of the handle 19 in a counter-clockwise direction as shown in the figures.

It is to be observed that both the retainer 3 and the lock 4 with its handle 19 are actuated to the closed position by force of gravity. Thus, both the handle 19 and the retainer 3 must be lifted to effect an uncoupling.

Figure 2:
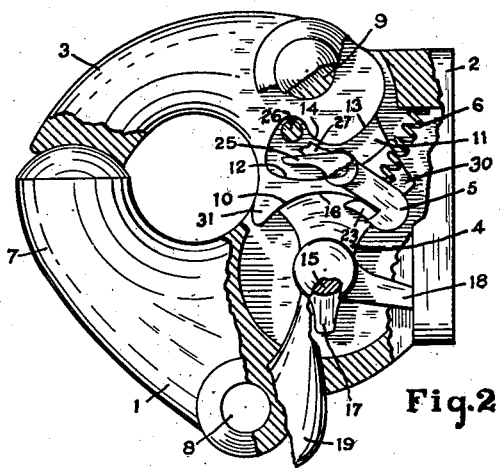
Figure 2 represents a view of the side of the coupling from which certain exterior fragments have been broken away to reveal interiorly disposed features.
Figure 3:
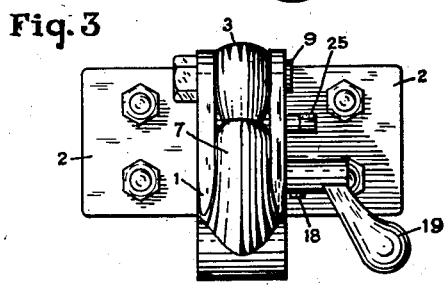
Figure 3 represents a view of the end of the coupling as it appears when attached to a tractor-car chassis.
Figure 4:
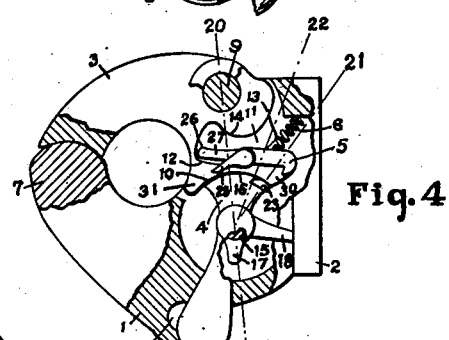
Figure 4 represents a view of the side of a coupling from which exterior fragments have been broken away to reveal certain relationships of the interiorly disposed members in one adjustment.

Another essential relationship of the elements described requires that contacting portions of the faces 10 and 16 of the retainer 3 and lock 4 respectively shall, when the coupling is in that adjustment shown in Figure 2, be removed a considerable perpendicular distance from a plane containing the axes of the pin 9 and shaft 15 indicated by the line 20 in Figure 4. Thus, a force acting to open the retainer 3 is resisted by a reaction acting through the axis of the shaft 15 whose position and direction are indicated by the line 21 in Figure 4.

The eccentricity of the face 16 of the rotary lock 4 is of double utility. First it provides for taking up lost motion in the parts affected so that the assembly will be snugly engaged and the parts strained through an appreciable extent to develop resisting forces calculated to prevent loss of contact between engaged parts occasioned by the maximum loads of service which otherwise would permit of the development of disruptive forces in heavy and rapidly oscillating members used in this service, resulting in excessive wear and consequent hazard to safety.

A second function of this eccentricity of the face 16 of the lock 4 is provided by positioning the center of curvature of this face on the line 22 medially of the lines 20 and 21 so that forces acting to open the retainer 3 will actually operate to rotate the lock 4 in a counterclockwise direction as the figures are shown and thus serve to further secure the coupling against accidental opening.

Now, as is well known, weights alone may not effectually prevent the upward movement of weighted parts carried upon a fast moving vehicle over ordinary roads. The tools in the toolbox bouncing up and down as the car travels over rough roads is an ample demonstration of this phenomenon. The force of gravity alone acting upon the mass of an object is insufficient to provide that celerity of motion of vertically oscillating members necessary to keep them in the fixed relationship normal to the variously supported and constrained parts when the same are at rest.

For this reason, the spring-actuated latch 5 engaging the lug 23 when the compression spring 6 is extended is supplied to provide a final locking device whose free mass is urged into the locked position by a force independent of gravity or nearly so. The spring 6 is of such strength as to develop a force exceeding any that might be developed by the weight of the latch actuated by normal road vibrations.

Thus it will be understood that the addition of the spring actuated latch 5 is not merely by way of aggregation but a combination of co-acting elements of distinctly different properties contributing a measure of safety otherwise unattainable.

The latch 5 is manually operated by means of the thumb-lever 25 and automatically operated by the mechanism shown in the Figures 4, 5, 6, 7, and 8.

Figure 6:
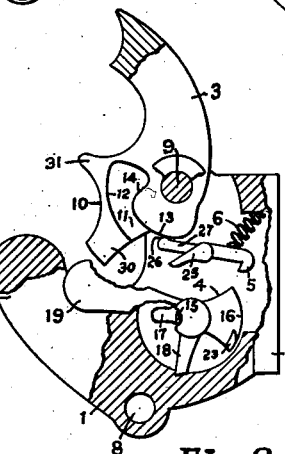
Figure 6 represents a view of the side of the coupling from which exterior fragments have been broken away to reveal certain relationships of the interiorly disposed members when the coupling is opened.
Figure 5:
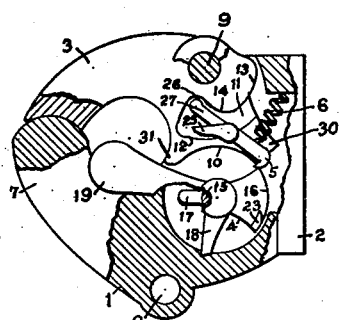
Figure 5 represents a view of the side of the coupling from which exterior fragments have been broken away to reveal certain relationships of the interiorly disposed members in a succeeding adjustment.

To open the coupling, the thumb-lever 25 is depressed to the position shown in Figure 4 where it will be observed that a lug 26 shown in Figure 2 disposed on the reverse side of the arm 27 in Figure 4 integral with the latch 5 has traversed the wide opening in the channel 11. The lock 4 may now be rotated in a clockwise direction to the position in which it and the connected parts are shown in Figure 5. The retainer 3 may now be lifted to the position in which it is shown in Figure 6 where it will be observed that the lug 26 on the reverse side of arm 27 is in contact with that portion of the inner wall of channel 11 of greatest and uniform radius which serves to retain the latch 5 clear of the path of the lug 23 on the lock 4.

Figure 7:
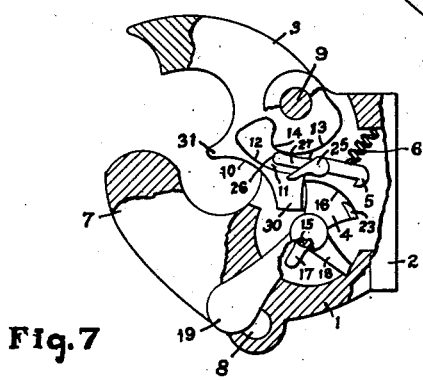
Figure 7 represents a view of the side of a coupling from which exterior fragments have been broken away to reveal the adjustment of the interiorly disposed members when the coupling is adjusted to the coupling position.

If the handle 19 be now released it will fall to the position in which it is shown in Figure 7 where it will be noticed that the lock 4 is in contact with the arm 30 and the retainer 3 is supported in the position shown in this figure. This is the coupling position. If the eye of a trailer-tongue be now dropped over the hook 7 it will carry with it the lug 31 and hence the retainer 3 will fall to the closed position. Simultaneously, the handle 19 will rise and then fall into the locked position where it will be secured by the immediate engagement of the latch 4 now released by the retainer cam consisting in the inner wall of the channel 11.

Figure 8:
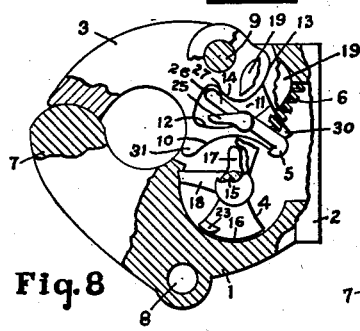
Figure 8 represents a view of the side of the coupling from which exterior fragments have been broken away to reveal the adjustment of the interiorly disposed members when the coupling is adjusted so that the trailer may be unhitched by simply raising the trailer-tongue, or the coupling locked securely by a movement of the lock-handle.

Still another adjustment is shown in Figure 8 where the trip 17 of the lock 4 is shown embraced in the arcuate face 10 of the retainer 3 and the handle 19 is inclined slightly beyond the vertical. This adjustment is quickly and readily effected because the handle 19 is moved to this position by the simple rotation thereof to the extreme position in which it is shown in Figure 8. When this has been done the necessity for the simultaneous critical adjustment of both the retainer 3 and the handle 19 as shown in Figure 7 has been eliminated. If, now, the retainer 3 be raised, the handle 19 will fall to the position shown in Figure 7 and the coupling made ready for receiving the trailer fitting as before described all of which may be done prior to the critical instant of actual coupling when safety to the operator is a prime consideration and he is encumbered with the weight of the trailer-tongue and needs both hands to manipulate it into place.

The advantages of these features of operation are quite obvious. It is further to be observed, however, that this design incorporates many advantages which provide for great strength, minimum weight, and facility of manufacture.

Having described my invention, what I claim is:

1. A trailer coupling comprising, a body formed with an upwardly terminating hook and attaching means, a retainer pivotally secured to the said body opposite the terminus of said hook formed with a sector portion integral therewith characterized by a concave arcuate surface, a rotary lock of sector form journaled in said body concentrically with said concave arcuate surface when the said retainer is in the closed position provided with a counterbalancing operating handle urging the lock in rotation to cause the engagement of the convex portion of the lock-sector with the said concave arcuate surface of said retainer, and a spring urged latch to retain the said rotary lock in the locked position.

2. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means formed with an arcuate surface removed from the pivotal axis thereof, and a rotary lock journaled in said body concentrically with said arcuate surface of said retainer formed with a sector adapted to engage the latter in the closed position.

3. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means formed with an arcuate surface removed from the pivotal axis thereof, and a rotary lock journaled in said body concentrically with said surface of said retainer in the closed position formed with a slightly eccentric sector adapted to engage said arcuate surface of said retainer adapted to secure the latter in the closed position under strain.

4. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means in a manner to provide vertical access to said hook-aperture formed with an arcuate surface removed from the pivotal axis thereof, and a rotary lock provided with an operating handle journaled in said body concentrically with said arcuate surface of said retainer formed with a sector adapted to engage the latter in the closed position.

5. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means in a manner to provide vertical access to said hook-aperture formed with an arcuate surface removed from the pivotal axis thereof, a rotary lock provided with an operating handle journaled in said body concentrically with said arcuate surface of said retainer formed with a sector adapted to engage the latter in the closed position, and a spring urged latch to retain the said rotary lock in the locked position.

6. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means in a manner to provide vertical access to said hook-aperture formed with an arcuate surface removed from the pivotal axis thereof, a rotary lock provided with an operating handle journaled in said body concentrically with said arcuate surface of said retainer formed with a slightly eccentric sector adapted to engage the latter in the closed position and impose a strain thereupon, and a spring urged latch to retain the said rotary lock in the locked position.

7. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means in a manner to provide vertical access to said hook-aperture when the same is open, and means to lock said retainer in the closed position.

8. A trailer coupling comprising, a body formed with attaching means and an upwardly terminating hook integral therewith and spaced therefrom forming an upwardly unrestricted aperture with said attaching means, a retainer journaled in said body between the aperture of said hook and said attaching means in a manner to provide vertical access to said hook-aperture when the same is open formed with a depending extension integral therewith disposed within the hook-aperture adapted to actuate said retainer in the closing movement when contacted by a descending trailer fitting in the coupling operation, and means to lock said retainer in the closed position.

DEWEY S. WEISS.